US012695152B2

(12) United States Patent (10) Patent No.: US 12,695,152 B2
Okamoto (45) Date of Patent: Jul. 28, 2026

(54) POWER STORAGE MODULE

(71) Applicant: KABUSHIKI KAISHA TOYOTA JIDOSHOKKI, Kariya (JP)

(72) Inventor: Yuki Okamoto, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 504 days.

(21) Appl. No.: 18/286,248

(22) PCT Filed: Jan. 21, 2022

(86) PCT No.: PCT/JP2022/002293
§ 371 (c)(1),
(2) Date: Oct. 10, 2023

(87) PCT Pub. No.: WO2022/249538
PCT Pub. Date: Dec. 1, 2022

(65) Prior Publication Data
US 2024/0186645 A1 Jun. 6, 2024

(30) Foreign Application Priority Data
May 26, 2021 (JP) ................................. 2021-088518

(51) Int. Cl.
*H01M 50/342* (2021.01)
*H01M 10/0585* (2010.01)
(Continued)

(52) U.S. Cl.
CPC ... *H01M 50/3425* (2021.01); *H01M 10/0585* (2013.01); *H01M 50/184* (2021.01);
(Continued)

(58) Field of Classification Search
CPC ........... H01M 10/0585; H01M 50/186; H01M 50/184; H01M 50/342; H01M 50/3425; H01M 50/30
See application file for complete search history.

(56) References Cited

U.S. PATENT DOCUMENTS

2007/0099070 A1* 5/2007 Aizawa ............. H01M 50/3425
429/82
2007/0275295 A1* 11/2007 Ray ........................ H01M 10/28
429/82

(Continued)

FOREIGN PATENT DOCUMENTS

JP 2018-092717 A 6/2018
JP 2020017434 A * 1/2020

OTHER PUBLICATIONS

International Search Report for PCT/JP2022/002293 dated Apr. 5, 2022.

*Primary Examiner* — Imran Akram
(74) *Attorney, Agent, or Firm* — Sughrue Mion, PLLC

(57) ABSTRACT
A power storage module includes a stack formed of electrodes stacked each including a current collector and an active material layer, a seal portion defining internal spaces, communication holes providing communication between the internal spaces and an outside, and a sheet member sealing the communication holes individually and cleaved to release internal pressure in the respective internal spaces. The sheet member has facing portions and a joint portion joined to the seal portion. The respective facing portions have stress concentrating portions. Cleavage pressure, which is the internal pressure applied to corresponding one of the facing portions when one of the stress concentrating portions is cleaved, is lower than peeling pressure, which is the internal pressure applied to corresponding one of the facing portion when the joint portion is peeled off from the seal portion.

9 Claims, 9 Drawing Sheets

(51) Int. Cl.
  *H01M 50/184* (2021.01)
  *H01M 50/186* (2021.01)
  *H01M 50/477* (2021.01)

(52) U.S. Cl.
  CPC ....... *H01M 50/186* (2021.01); *H01M 50/342*
      (2021.01); *H01M 50/477* (2021.01)

(56) References Cited

U.S. PATENT DOCUMENTS

2012/0015218 A1\* 1/2012 Lee ........................ H01M 50/30
                                                429/53
2018/0190956 A1\* 7/2018 Lica .................... H01M 50/264
2020/0403200 A1\* 12/2020 Tamaru .............. H01M 50/317

\* cited by examiner

POWER STORAGE MODULE

CROSS REFERENCE TO RELATED APPLICATIONS

This application is a National Stage of International Application No. PCT/JP2022/002293 filed Jan. 21, 2022, claiming priority based on Japanese Patent Application No. 2021-088518 filed May 26, 2021, the contents of all of which are incorporated herein by reference in their entirety.

TECHNICAL FIELD

The present disclosure relates to a power storage module.

BACKGROUND ART

A power storage device is described in Patent Document 1. This power storage device has a plurality of bipolar electrodes stacked one another with a separator interposed therebetween. Each bipolar electrode has a current collector, a positive electrode layer formed on one side of the current collector, and a negative electrode layer formed on the other side of the current collector. The power storage device has spacers that each keep a distance between the current collectors of the bipolar electrodes adjacent to each other and are each used for forming an accommodation space between the current collectors. The spacers each include a first seal portion and a second seal portion. A communication portion providing communication between the accommodation space and an outside of the power storage device is formed in the first seal portion. The second seal portion is inserted into the communication portion to completely fill the communication portion, so that the second seal portion cooperates with the first seal portion to seal the accommodation space. A pressure resistance of the second seal portion against pressure in the accommodation space is lower than that of the first seal portion. With this characteristics, when the pressure in the accommodation space increases to a specified threshold value, the second seal portion is pushed outward from the accommodation space side to relieve the pressure in the accommodation space.

CITATION LIST

Patent Document

Patent Document 1: Japanese Patent Application Publication No. 2018-092717

SUMMARY OF INVENTION

Technical Problem

In the power storage device described in the Patent Document 1, the second seal portion is inserted into a corresponding communication portion, so that the pressure in the respective accommodation spaces is relieved when internal pressure in the accommodation spaces increases. However, as the number of the stacked bipolar electrodes increases, the number of components such as the second seal portions also increases, and thus it is necessary to prepare the same number of components such as second seal portions as the number of the stacked bipolar electrodes, which is not preferable.

The present disclosure is directed to providing a power storage module in which pressure in respective internal spaces is relieved when internal pressure in the respective internal spaces increases while the increase of the number of components in the power storage module is suppressed even when a plurality of electrodes is stacked one another.

Solution to Problem

The power storage module according to the present disclosure includes: a stack formed of a plurality of electrodes stacked each including a current collector and an active material layer formed on the current collector; a seal portion formed in the current collectors and cooperating with the current collectors arranged side by side in a stacking direction of the electrodes to define a plurality of internal spaces that accommodates the respective active material layers; a plurality of communication holes formed in the seal portion and providing communication between the plurality of internal spaces and an outside; and a sheet member provided on the seal portion over the plurality of communication holes, sealing the communication holes individually, and cleaved to release internal pressure in the plurality of respective internal spaces to the outside through the corresponding communication holes. The sheet member has a plurality of facing portions facing first openings that are located opposite to the respective internal spaces across the plurality of communication holes and a joint portion that is formed in peripheries of the respective facing portions to enclose the first openings and joined to the seal portion The respective facing portion have stress concentrating portions that serve as starting points of the cleaving. Cleavage pressure, which is the internal pressure applied to corresponding one of the facing portions when one of the stress concentrating portions is cleaved, is lower than peeling pressure, which is the internal pressure applied to corresponding one of the facing portions when the joint portion is peeled off from the seal portion.

This power storage module is formed of the plurality of electrodes stacked each including the current collector and the active material layer, and the seal portion is formed in the current collectors. The seal portion has the communication holes that communicate with the respective internal spaces each including the active material layer. The sheet member is provided on the seal portion over the plurality of communication holes, and seals the respective communication holes individually. The sheet member has the facing portions facing the first openings that are located opposite to the respective internal spaces across the communication holes and the stress concentrating portions that serve as the starting points of the cleaving are formed in the respective facing portions. The cleavage pressure, which is the internal pressure applied to the corresponding one of the facing portions when the one of the stress concentrating portions are cleaved, is lower than the peeling pressure, which is the internal pressure applied to the corresponding one of the facing portions when the joint portion is peeled off from the seal portion. Accordingly, when the internal pressure in one of the internal spaces increases, the corresponding sheet member is cleaved at the stress concentrating portion as the starting point in the facing portion facing the communication hole that communicates with the internal space, thereby releasing the internal pressure in the internal space individually and irreversibly. Thus, with this power storage module, the plurality of internal spaces is sealed collectively, so that the increase of the number of components is suppressed even when the plurality of electrodes is stacked one another and the internal pressure in the respective internal spaces is individually released when the internal pressure increases.

In the power storage module according to the present disclosure, the sheet member may include a first resin layer that is joined to the seal portion and a metal layer that is stacked on the first resin layer and located opposite to the seal portion across the first resin layer. With this configuration, the first resin layer keeps adhesiveness of the respective sheet members to the seal portion and the metal layer restricts moisture permeation to the internal spaces.

In the power storage module according to the present disclosure, the sheet member may include the second resin layer that is stacked on the metal layer and located opposite to the first resin layer across the metal layer. With this configuration, the second resin layer restricts corrosion and a short-circuit of the metal layer.

In the power storage module according to the present disclosure, the stress concentrating portions may each include a groove portion formed in at least one of the first resin layer or the second resin layer. With this configuration, the stress concentrating portions are formed with a breaking strength in the whole of the sheet members being maintained. Specifically, in a case where the groove portion is formed in the second resin layer located outside relative to the other layers, when the sheet member is deformed so as to swell outwardly by the increase of the internal pressure in the internal spaces, tensile stress is further concentrated on the groove portion.

In the power storage module according to the present disclosure, the stress concentrating portions may each include a bending portion formed in the metal layer. With this configuration, the stress concentrating portions are formed with a simple structure.

In the power storage module according to the present disclosure, the seal portion may have outer side surfaces on which the respective first openings are formed and a frame portion that protrudes from the outer side surfaces such that the frame portion encloses the first openings, and the joint portion may be joined to the frame portion. With this configuration, the joint portion between the sheet member and the seal portion is limited to the frame portion, so that the sheet member is easily joined to the seal portion.

In the power storage module according to the present disclosure, the following configuration may be used: the active material layers have grooves that extend from the one ends to the other ends of the respective active material layers, and second openings of the plurality of communication holes oriented to the respective internal spaces are formed in portions of the seal portion facing the one ends of the respective active material layers. With this configuration, gas generated in the internal spaces smoothly flows into the communication holes along the grooves of the active material layers, so that the sheet member are quickly cleaved.

In the power storage module according to the present disclosure, the following configuration may be used: the stack is restrained in the stacking direction of the electrode by restraining plates, the restraining plates have grooves that extend from one ends to the other ends of the respective restraining plates, and the second openings of the plurality of communication holes oriented to the respective internal spaces are formed in portions of the seal portion facing the one ends of the respective restraining plates when viewed in the stacking direction. With this configuration, gas generated in the internal spaces smoothly flows into the communication holes along the grooves of the restraining plates, so that the sheet member are quickly cleaved.

In the power storage module according to the present disclosure, the following configuration may be used: the plurality of communication holes includes a first communication hole communicating with the internal space that accommodates the active material layer of the electrode located in an outermost layer of the stack and second communication holes different from the first communication hole, and the cleavage pressure in the stress concentrating portion formed in the facing portion facing the first opening of the first communication hole of the plurality of facing portions is different from the cleavage pressure in the stress concentrating portions formed in the facing portions facing the first openings of the respective second communication holes of the plurality of facing portions. Generally speaking, the aspects of increase of the internal pressure may be different between in the internal space in correspondence with the electrode located in the outermost layer of the stack and in the internal spaces in correspondence with the electrodes inside the stack. Accordingly, with this configuration, using the stress concentrating portions having cleavage pressure different between in the outermost layer of the stack and in the other layers may be effective.

Advantageous Effect of Invention

The present disclosure provides the power storage module in which the internal pressure in the plurality of respective internal spaces is relieved individually and irreversibly while the plurality of internal spaces is sealed collectively.

BRIEF DESCRIPTION OF DRAWINGS

FIG. 1 is a side view schematically illustrating a power storage device according to an embodiment.

FIG. 2 is a cross-sectional view schematically illustrating a power storage module illustrated in FIG. 1.

FIG. 3 is a perspective view of the power storage module illustrated in FIG. 2.

FIG. 4 is an exploded perspective view (partially including a cross-sectional view) partially illustrating an enlarged part of FIG. 3.

FIG. 5 is a cross-sectional view schematically illustrating a state in which a sheet member is attached to a seal portion illustrated in FIGS. 3 and 4.

FIG. 9 is a plan view schematically illustrating a positional relationship between an active material layer and the sheet member.

DESCRIPTION OF EMBODIMENTS

Figure 6:
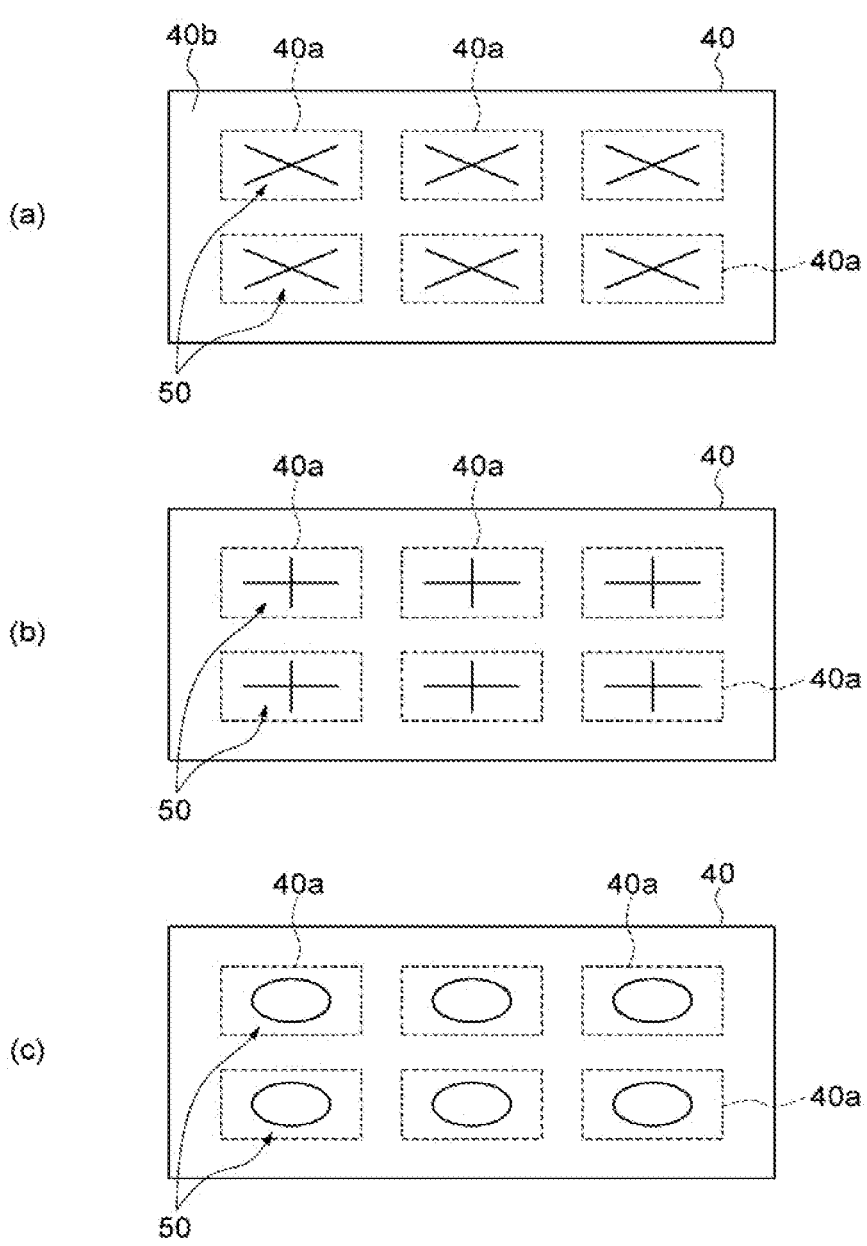
FIG. 6 is a plan view illustrating examples of the sheet member illustrated in FIG. 5.

The following will describe a power storage device according to an embodiment in detail with reference to the drawings. A Cartesian coordinate system consisting of an X-axis, a Y-axis, and a Z-axis may be illustrated in the respective drawings. In explanations of the respective drawings, the same or equivalent elements may be denoted by the same reference numerals, and redundant description may be omitted.

Figure 1:
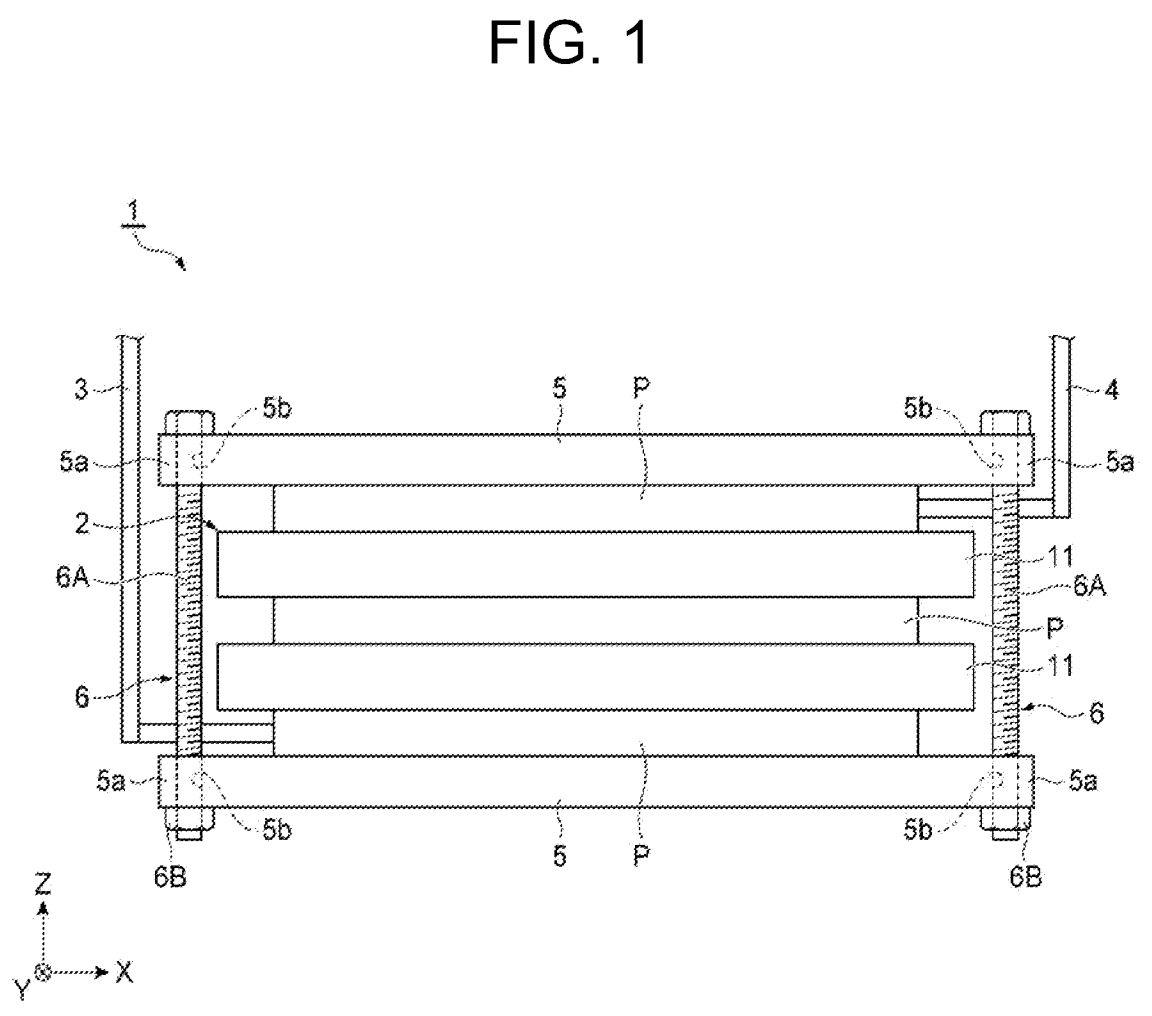

FIG. 1 is a side view schematically illustrating a power storage device according to the embodiment. A power storage device 1 illustrated in FIG. 1 is, for example, a device used for a battery in various vehicles such as a forklift, a hybrid vehicle, or an electric vehicle. The power storage device 1 includes a module stack 2 including power storage modules 11, connecting members 3, 4 electrically connected to the module stack 2, a pair of end plates 5 for restraining the module stack 2, and fastening members 6 fastening the end plates 5 with each other.

The module stack 2 is formed of the plurality of power storage modules 11 and a plurality of conductive plates P, which are alternately stacked in a Z-axis direction. In an example illustrated in FIG. 1, the module stack 2 includes two power storage modules 11 and three conductive plates P. One of the three conductive plates P is disposed between the two power storage modules 11, and the other two are disposed in respective outer ends of the module stack 2 in a stacking direction of the power storage modules 11. These conductive plates P are each electrically connected to an electrode composing the respective power storage modules 11. Here, the two power storage modules 11 are connected in series through the conductive plate P therebetween.

A plurality of passages (not illustrated) through which a cooling medium such as air flows may be formed inside the conductive plates P. When the cooling medium flows through the passages inside the conductive plates P, the conductive plates P serve as a heat sink for dissipating heat away from the power storage modules 11 in addition to serving as a connecting member for electrically connecting the plurality of power storage modules 11. In the example in FIG. 1, areas of the respective conductive plates P are slightly smaller than those of the respective power storage modules 11. In a view of improving heat dissipation of the conductive plates P, the areas of the respective conductive plates P may be equal to or slightly larger than those of the respective power storage modules 11.

The connecting members 3, 4 correspond to conductive members (busbars) serving as a positive electrode terminal and a negative electrode terminal of the power storage device 1, respectively. While the connecting member 3 is electrically connected to the conductive plate P on a positive electrode side of the power storage device 1, the connecting member 4 is electrically connected to the conductive plate P on a negative electrode side of the power storage device 1. The connecting members 3, 4 are made of metal material or alloy material, for example. Examples of the metal material include copper, aluminum, titan, nickel, and the like. Examples of the alloy material include a stainless steel plate (such as SUS301 and SUS304) and an alloy of the above-described metal material. A heat dissipation fin (not illustrated) superior in thermal conductivity may be attached to at least one of the connecting members 3, 4. With this configuration, heat is effectively dissipated away from the power storage modules 11 through the conductive plates P, the connecting members 3, 4, and the heat dissipation fin.

The pair of end plates 5 and the fastening members 6 form a restraining member by which a restraint load is applied to the module stack 2 in the stacking direction of the power storage modules 11. The pair of end plates 5 are provided so as to hold the module stack 2 therebetween in the stacking direction. The end plates 5 are made of a metal plate, for example. Examples of a material used for the end plates 5 include an alloy of copper, aluminum, titan, nickel, or stainless steel, and the like. As illustrated in FIG. 1, the end plates 5 are each formed in a rectangular shape when viewed in the stacking direction, and slightly larger than a shape (a rectangular shape in the present embodiment) of the module stack 2 when viewed in the stacking direction. The end plates 5 are coaxial with the module stack 2 when viewed in the stacking direction. Accordingly, edge portions in four sides of the respective end plates 5 correspond to projecting portions 5a projecting out over holding portions of the respective end plates 5 at which the module stack 2 is held.

The fastening members 6 are formed of bolts 6A and nuts 6B, for example. The bolts 6A are inserted into insertion holes 5b formed on the respective projecting portions 5a of the pair of end plates 5 and screwed into the nuts 6B to fasten the pair of end plates 5. Thus, the restraint load is applied to the module stack 2 in the stacking direction of the power storage modules 11 through the pair of end plates 5. In the present embodiment, when viewed in the stacking direction, the fastening members 6 are disposed along the edge portions of the four sides in the projecting portions 5a of the respective end plates 5 at equal intervals as well as disposed at four corners of the end plates 5.

Figure 2:
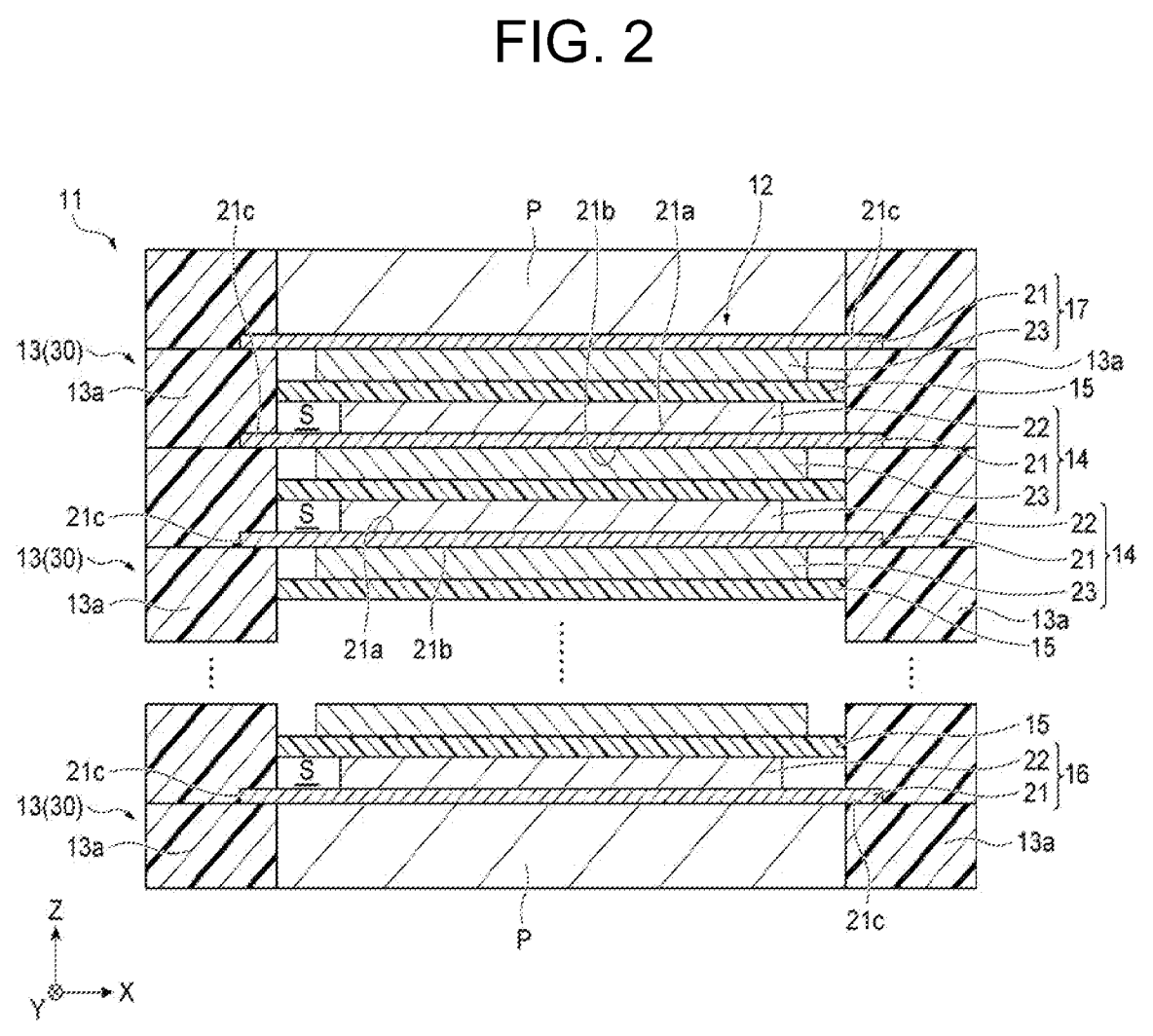

FIG. 2 is a cross-sectional view schematically illustrating a layer configuration of each of the power storage modules illustrated in FIG. 1. The power storage modules 11 each correspond to a single cell formed in a right rectangular prism shape, which is flat in the Z-axis direction. In the present embodiment, a bipolar lithium-ion secondary battery is used as an example of the power storage modules 11. The power storage modules 11 each include an electrode stack (stack) 12 including a plurality of bipolar electrodes (electrodes) 14 and sealing members 13. The bipolar electrodes 14 in the electrode stack 12 are stacked in the Z-axis direction. A stacking direction of the bipolar electrodes 14 extends along the Z-axis direction and coincides with the stacking direction of the power storage modules 11 in the module stack 2.

The bipolar electrodes 14 each include a current collector 21, a positive electrode active material layer (active material layer) 22 formed on a first surface 21a of the current collector 21, and a negative electrode active material layer (active material layer) 23 formed on a second surface 21b of the current collector 21. The current collector 21 and the positive electrode active material layer 22 formed on the first surface 21a of the current collector 21 compose a positive electrode in each of the bipolar electrodes 14, and the current collector 21 and the negative electrode active material layer 23 formed on the second surface 21b of the current collector 21 compose a negative electrode in each of the bipolar electrodes 14.

The current collector 21 is a conductive member formed in a sheet shape, which looks a rectangular shape in plan view, and has the first surface 21a and the second surface 21b opposite to the first surface 21a. The current collector 21 is made of a metal foil or an alloy foil, for example. Examples of the metal foil include a copper foil, an aluminum foil, a titan foil, a nickel foil, and the like. Examples of the alloy foil include a stainless steel foil (for example, SUS304, SUS316, SUS301, and the like defined in JIS G 4305:2015), a plated steel plate (for example, cold-reduced carbon steel sheet (such as SPCC) defined in JIS G 3141: 2005), and a plated stainless steel plate. The alloy foil may be formed of metals shown as the examples of the materials of the above-described metal foil. The current collector 21 may be formed of a plurality of metal foils integrated with each other, and may be formed by plating another metal on surfaces of a metal foil.

The positive electrode active material layer 22 corresponds to a layered member including a positive electrode active material, a conductive assistant, and a binder. Examples of the positive electrode active material include a complex oxide, a lithium metal, and sulfur. The complex oxide contains lithium and at least one of iron, manganese, titan, nickel, cobalt, and aluminum. Examples of the complex oxide include olivine type lithium iron phosphate (LiFePO4).

The binder is used for maintaining a conducting network in the electrode by binding the active material or the conductive assistant to the surfaces of the current collector 21. Examples of the binder include fluorine-containing resins such as polyvinylidene fluoride, polytetrafluoroethylene, and fluorine rubber; thermoplastic resins such as polypropylene and polyethylene; imide-based resins such as polyimide and polyamide-imide; alkoxysilyl group-containing resins; acrylic resins including a monomer unit such as acrylic acid and methacrylic acid; styrene-butadiene rubber (SBR); carboxymethyl cellulose; alginates such as sodium alginate and ammonium alginate; water-soluble cross-linked cellulose ester; starch-acrylic acid graft polymers; and the like. These binders may be used alone or in combination with each other. Examples of the conductive assistant includes acetylene black, carbon black, graphite, and the like. Solvent for viscosity modification such as N-methyl-2-pyrrolidone (NMP) may be used for the positive electrode active material layer 22.

The negative electrode active material layer 23 corresponds to a layered member including a negative electrode active material, a conductive assistant, and a binder. Examples of the negative electrode active material include carbon such as graphite, artificial graphite, highly oriented graphite, mesocarbon microbeads, hard carbon, and soft carbon; a metal compound; an element alloyed with lithium or a compound of the element; and a boron-doped carbon. Examples of the element alloyed with lithium include silicon (silicon) and tin. The conductive assistant and binder may be the same as those used in the positive electrode active material layer 22.

In the electrode stack 12, the bipolar electrodes 14 arranged side by side in the stacking direction of the bipolar electrodes 14 are disposed such that the positive electrode active material layer 22 of one of the bipolar electrodes 14 faces the negative electrode active material layer 23 of the other of the bipolar electrodes 14 adjacent to the one of the bipolar electrodes 14. A separator 15 is disposed between the bipolar electrodes 14 arranged side by side. In the present embodiment, the separator 15 is a sheet-shaped member, which looks a rectangular shape in plan view, and prevents a short circuit between the bipolar electrodes 14 arranged side by side in the stacking direction. The separator 15 is formed of a porous film made of polyolefin-based resin such as polyethylene (PE) or polypropylene (PP). The separator 15 may be formed of non-woven fabric or woven fabric made of polypropylene, methyl cellulose, or the like. The separator 15 may be reinforced by vinylidene fluoride resin compound.

The electrode stack 12 has a positive terminal electrode (electrode) 16 and a negative terminal electrode (electrode) 17 in addition to the bipolar electrodes 14. The positive terminal electrode 16 includes the current collector 21 and the positive electrode active material layer 22 formed on the first surface 21a of the current collector 21. The positive terminal electrode 16 is disposed on one end side of the electrode stack 12 in the stacking direction such that the positive electrode active material layer 22 on the first surface 21a faces the negative electrode active material layer 23 of the bipolar electrode 14 that is located on one distal end of the stacked bipolar electrodes 14 in the stacking direction thereof. The negative electrode active material layer 23 is not formed on the second surface 21b of the current collector 21 in the positive terminal electrode 16, and the second surface 21b is electrically connected to the conductive plate P adjacent to the positive terminal electrode 16.

The negative terminal electrode 17 includes the current collector 21 and the negative electrode active material layer 23 formed on the second surface 21b of the current collector 21. The negative terminal electrode 17 is disposed on the other end side of the electrode stack 12 in the stacking direction such that the negative electrode active material layer 23 on the second surface 21b faces the positive electrode active material layer 22 of the bipolar electrode 14 that is located on the other distal end of the stacked bipolar electrodes 14 in the stacking direction thereof. The positive electrode active material layer 22 is not formed on the first surface 21a of the current collector 21 in the negative terminal electrode 17, and the first surface 21a is electrically connected to the conductive plate P adjacent to the negative terminal electrode 17.

The above-described separator 15 is also disposed between the bipolar electrode 14 and the positive terminal electrode 16 and between the bipolar electrode 14 and the negative terminal electrode 17 in addition to being disposed between the bipolar electrodes 14 arranged side by side in the stacking direction. The separator 15, which is disposed between the bipolar electrode 14 and the positive terminal electrode 16 and between the bipolar electrode 14 and the negative terminal electrode 17, prevents a short circuit therebetween.

The sealing portions 13 are disposed in a side portion of the electrode stack 12, which extends in the stacking direction, and seal the electrode stack 12. The sealing portions 13 each have a rectangular frame shape extending along an outline of the current collectors 21 when viewed in the stacking direction. The sealing portions 13 are welded to edge portions 21c of the respective current collectors 21 on the first surface 21a thereof. The sealing portions 13 may be also welded to the edge portions 21c of the respective current collectors 21 on the second surface 21b thereof in one of the bipolar electrodes 14 adjacent to the other of the bipolar electrodes 14 in the stacking direction.

In the positive terminal electrode 16, the sealing portion 13 is welded to the edge portions 21c of the corresponding current collector 21 on both of the first surface 21a and the second surface 21b of the current collector 21. In the negative terminal electrode 17, the sealing portion 13 is welded to the edge portions 21c of the corresponding current collector 21 on the first surface 21a thereof.

For example, the sealing portions 13 are made of resin having heat resistance and corrosion resistance against electrolyte solution, for example. Examples of such a resin include polyimide, polypropylene (PP), polyphenylene sulfide (PPS), or modified polyphenyleneether (modified PPE). Internal spaces S defined by the respective sealing portions 13 and the current collectors 21 arranged side by side in the stacking direction accommodates electrolyte solution, which is not illustrated. The electrolyte solution is, for example, carbonate-based or polycarbonate-based electrolyte solution. Lithium salt may be used as a supporting electrolyte dissolved in the solution. Examples of the lithium salt include LiBF4, LiPF6, LiN(SO2CF3)2, LiN(SO2C2F5)2, or a mixture thereof.

The sealing portions 13 have projecting portions 13a projecting out over edges of the current collectors 21. The projecting portions 13a of the sealing portions 13 arranged side by side in the stacking direction are welded to each other. With this configuration, in the respective power storage modules 11, a seal portion 30 is formed of the plurality of sealing portions 13 and seals the respective internal spaces S.

Thus, the power storage modules 11 are each formed of the plurality of bipolar electrodes 14, the positive terminal electrode 16, and the negative terminal electrode 17 that are stacked with each other, and each include the electrode stack 12 having the plurality of internal spaces S each accommodating the active material layers (the positive electrode active material layer 22 and the negative electrode active material layer 23) on the respective electrodes 14, 16, 17 arranged side by side in the stacking direction of the bipolar electrodes 14. More specifically, the plurality of internal spaces S include the internal spaces S that each accommodate the positive electrode active material layer 22 on one of the bipolar electrodes 14 adjacent to each other in the stacking direction and the negative electrode active material layer 23 on the other of the bipolar electrodes 14. The plurality of internal spaces S also include the internal space S that accommodates the negative electrode active material layer 23 on the bipolar electrode 14 adjacent to the positive terminal electrode 16 in the stacking direction and the positive electrode active material layer 22 on the positive terminal electrode 16. The plurality of internal spaces S also include the internal space S that accommodates the positive electrode active material layer 22 on the bipolar electrode 14 adjacent to the negative terminal electrode 17 in the stacking direction and the negative electrode active material layer 23 on the negative terminal electrode 17. The power storage modules 11 each include the sealing portions 13 (the seal portion 30) formed on the respective current collectors 21 to seal the internal spaces S. In particular, the seal portion 30 has a configuration for adjusting internal pressure in the respective internal spaces S. Subsequently, this point will be specifically explained.

Figure 3:
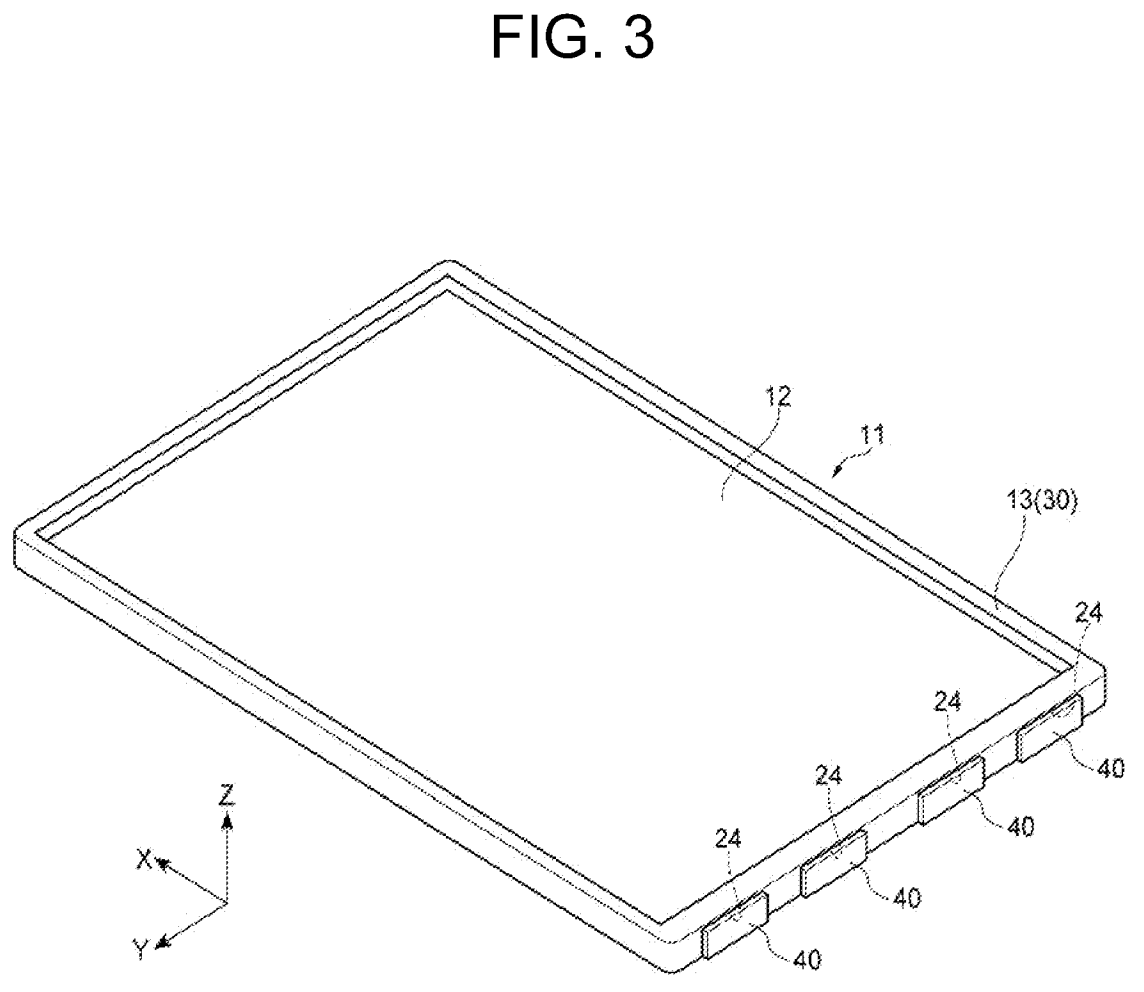
Figure 4:
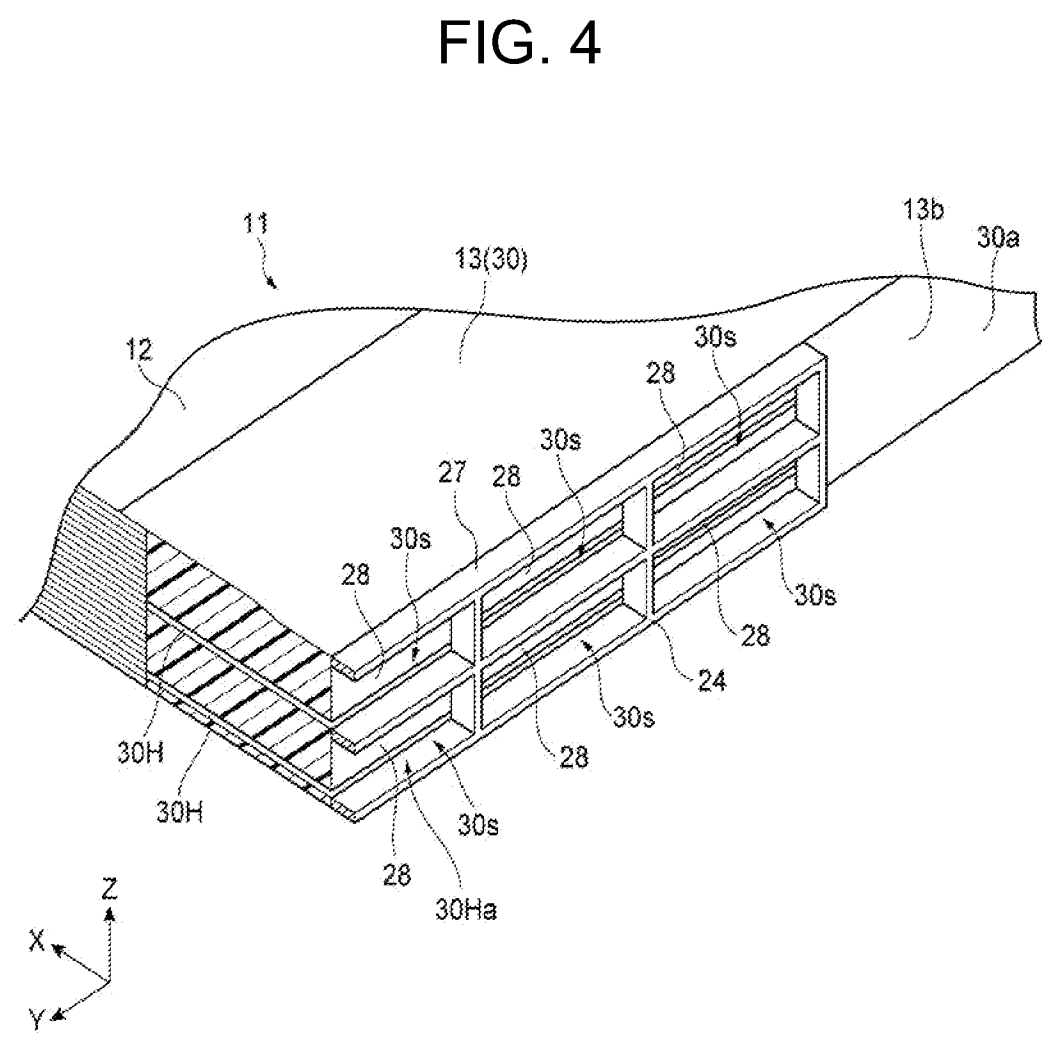

FIG. 3 is a perspective view of the power storage module illustrated in FIG. 2. FIG. 4 is an exploded perspective view (partially including a cross-sectional view) partially illustrating an enlarged part of FIG. 3. As illustrated in FIGS. 3 and 4, a wall portion 30a, which is one of wall portions composing the seal portion 30, has a plurality (four in the present embodiment) of attaching areas 24 in which sheet members 40 for adjusting the internal pressure of the respective internal spaces S are attached. The wall portion 30a corresponds to the wall portion including outer side surfaces 13b of the sealing portions 13. A plurality (six in the present embodiment) of communication holes 30H are formed (open) in each of the attaching areas 24. The communication holes 30H provide communication between the respective internal spaces S and the outside of the power storage device 1. The respective communication holes 30H communicate with the different internal spaces S. The communication holes 30H are formed in the respective sealing portions 13. The communication holes 30H extend to the respective internal spaces S through the sealing portions 13. As a result, the communication holes 30H communicate with the respective internal spaces S. The communication holes 30H are disposed in three rows and two tiers (three rows in the Y-axis direction and two tiers in the Z-axis direction) in each of the attaching areas 24. Accordingly, the communication holes 30H are arranged in twelve rows and two tiers in the wall portion 30a.

The communication holes 30H have openings (first openings) 30Ha formed in the respective outer side surfaces 13b of the sealing portions 13 (that is, an outer surface of the wall portion 30a of the seal portion 30). The openings 30Ha are located opposite to the respective internal spaces S across the communication holes 30H and formed on the outer side surfaces 13b to open. Frame portions 27 are formed in the respective attaching areas 24 and protrude from the outer surface of the wall portion 30a of the seal portion 30. The frame portions 27 are formed so as to enclose the respective openings 30Ha of the communication holes 30H. Thus, the respective frame portions 27 defines a plurality (six in the present embodiment) of spaces 30s connecting to the respective communication holes 30H. The spaces 30s are separately formed by separation walls in the respective frame portions 27. The communication holes 30H and the corresponding spaces 30s connecting to the communication holes 30H form passages 28 through which gas flows from the respective internal spaces S.

Figure 5:
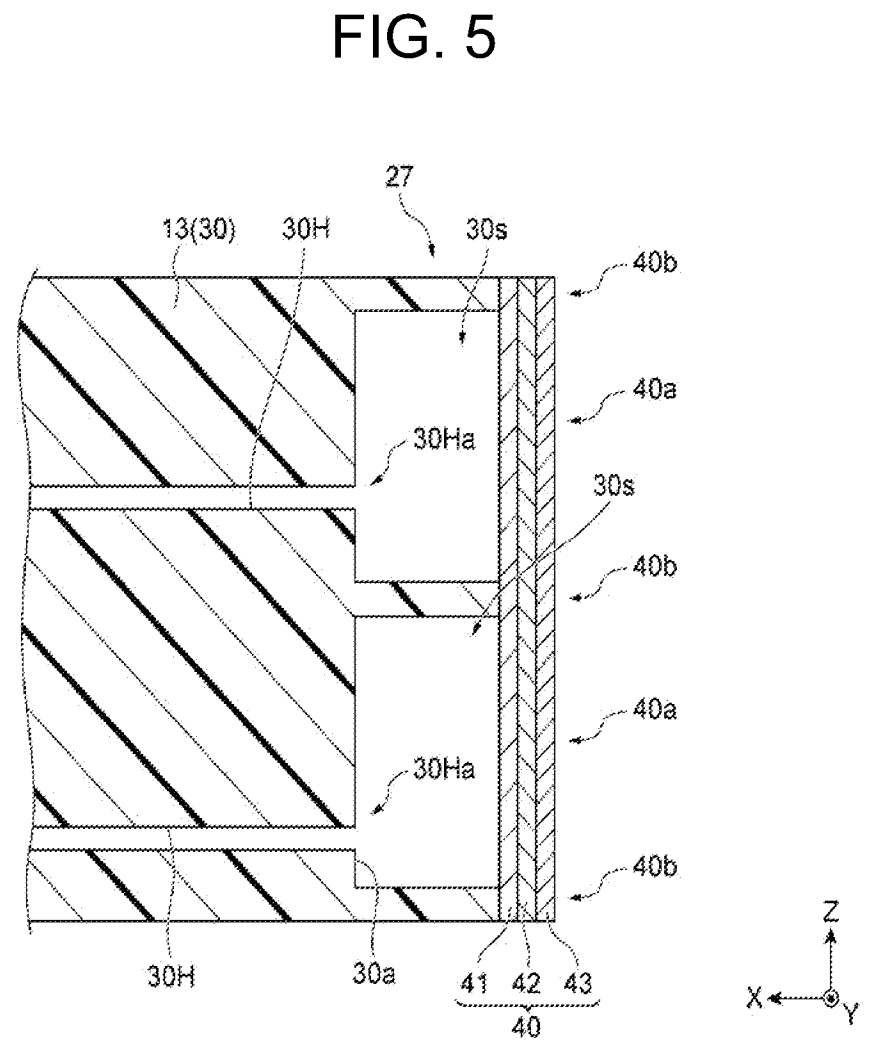
Figure 7:
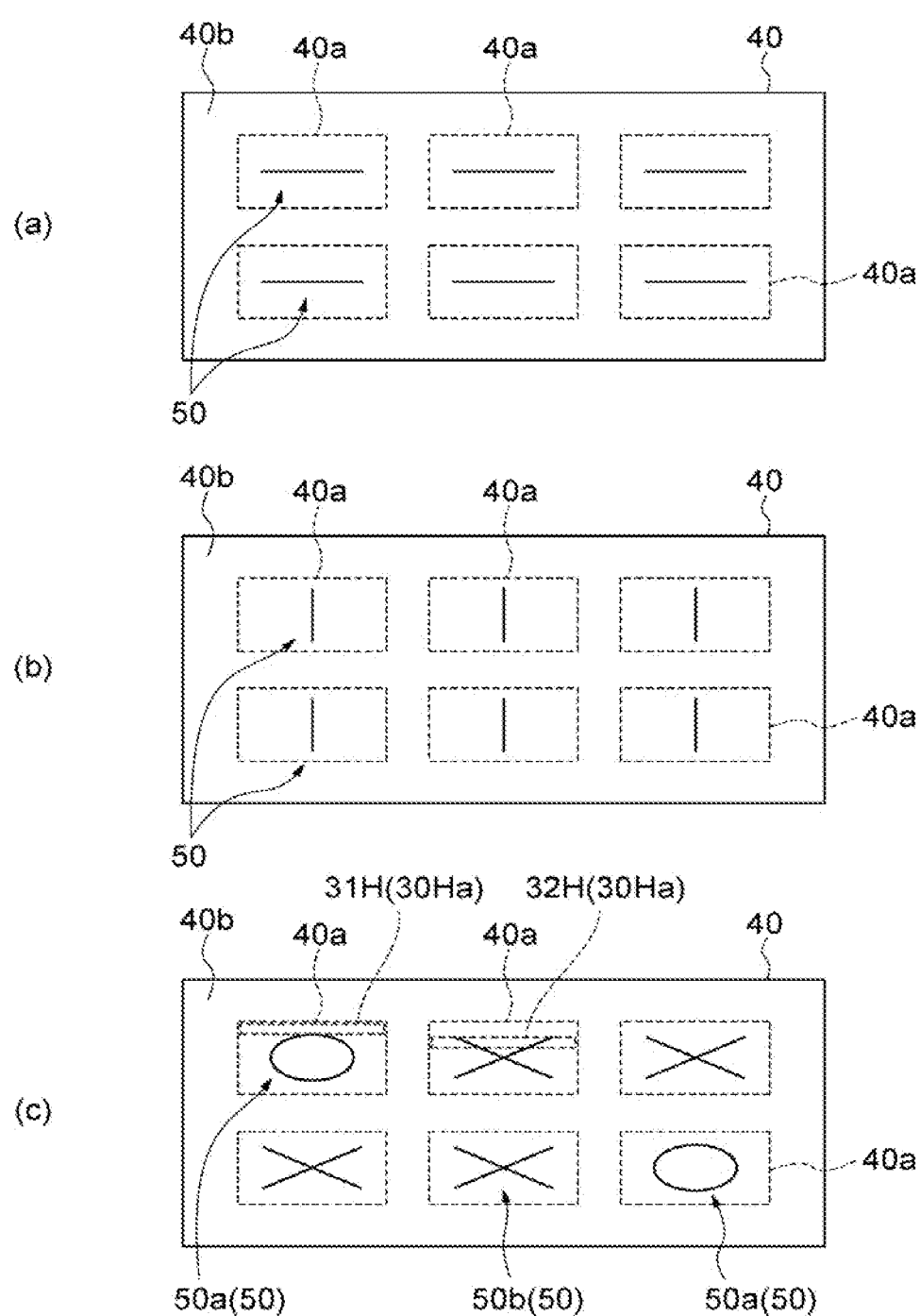
FIG. 7 is a plan view illustrating examples of the sheet member illustrated in FIG. 5.

FIG. 5 is a cross-sectional view schematically illustrating a state in which the sheet member is attached to the seal portion illustrated in FIGS. 3 and 4. FIGS. 6 and 7 are plan views of examples of the sheet member illustrated in FIG. 5. As illustrated in FIGS. 5 to 7, the sheet members 40 are attached to the seal portion 30 through the respective frame portions 27. The sheet members 40 are joined to the seal portion 30 (the frame portions 27 in the present embodiment) by welding or adhering, for example. More specifically, the sheet members 40 each have a plurality of facing portions 40a facing the respective openings 30Ha of the communication holes 30H (that is, facing the spaces 30s) and a joint portion 40b that is formed in peripheries of the respective facing portions 40a to enclose the openings 30Ha and joined to the seal portion 30 (the frame portions 27 in the present embodiment). That is, the seal portion 30 has the outer side surfaces 13b on which the openings 30Ha are formed and the frame portions 27 that protrude from the outer side surfaces 13b such that the respective frame portions 27 enclose the openings 30Ha when viewed in a direction orthogonal to the outer side surfaces 13b, and the joint portion 40b is joined to the corresponding one of the frame portions 27.

The number of the facing portions 40a in one of the sheet members 40 is the same as the number of the communication holes 30H in one of the attaching areas 24, for example, six. With this configuration, one of the facing portions 40a cooperates with the joint portion 40b formed in the periphery of the facing portion 40a to seal the corresponding one of the communication holes 30H and the space 30s connecting to the communication hole 30H. Thus, one of the sheet members 40 is provided on the seal portion 30 over the plurality (six in the present embodiment) of communication holes 30H and seals the respective communication holes 30H individually.

The sheet members 40 are each formed of a plurality of layers in the present embodiment. More specifically, the sheet members 40 each include a first resin layer 41, a metal layer 42, and a second resin layer 43, which are stacked with each other. The first resin layer 41 is joined to the seal portion 30 (the frame portion 27). That is, the first resin layer 41 is closest to the seal portion 30 of the plurality of layers and corresponds to an adhering layer that adheres to the seal portion 30. Accordingly, a material of the first resin layer 41 is selected as desired considering an adhesiveness between the material of the first resin layer 41 and a resin material of the frame portions 27 in the seal portion 30.

The metal layer 42 is stacked on the first resin layer 41 and located opposite to the seal portion 30 across the first resin layer 41. The metal layer 42 is joined to the first resin layer 41 and integrally formed with the first resin layer 41. The metal layer 42 maintains a pressure resisting strength in the whole of each of the sheet members 40, and also, for example, serves for restricting moisture permeation to the corresponding internal space S through the sheet member 40.

The second resin layer 43 is stacked on the metal layer 42 and located opposite to the first resin layer 41 across the metal layer 42. The second resin layer 43 is joined to the metal layer 42 and integrally formed with the metal layer 42. With these configurations, the first resin layer 41, the metal layer 42, and the second resin layer 43 are integrally formed all over the surfaces thereof to become a laminated film shape. The second resin layer 43 covers at least the metal layer 42 to contribute to restricting corrosion and a short circuit of the metal layer 42.

The above-described sheet members 40 have a following function: when the internal pressure in one of the internal spaces S increases, a portion of the sheet member 40 in correspondence with the internal space S is selectively broken, which releases the internal pressure in the internal space S to the outside irreversibly. More specifically, the respective sheet members 40 have, on the facing portions 40a thereof, stress concentrating portions 50. For example, when gas generated in the internal spaces S increases the internal pressure in the internal spaces S, the communication holes 30H, and the spaces 30s and the internal pressure is applied to the facing portions 40a to deform such that the facing portions 40a swell outwardly, the stress concentrating portions 50 serve as starting points of cleaving of the facing portions 40a, which results from a tensile stress concentrated by the deformation caused by the internal pressure. The tensile stress generated in the stress concentrating portions 50 linearly increases as the internal pressure applied to the facing portions 40a increases. Here, the internal pressure applied to corresponding one of facing portions 40a when one of the stress concentrating portions 50 is cleaved (that is, the internal pressure in correspondence with the tensile stress at which the stress concentrating portion 50 is broken) is defined as cleavage pressure.

Thus, the stress concentrating portions 50 are formed in the respective facing portions 40a in each of the sheet members 40. When internal pressure in one of the internal spaces S increases, a portion (facing portion 40a) in correspondence with the internal space S is selectively broken due to the stress concentrating portion 50, so that only the internal pressure S in the internal space is adjustable.

Figure 8:
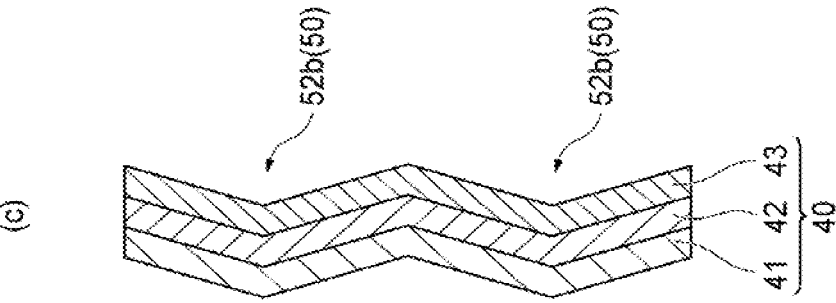
FIG. 8 is a cross-sectional view illustrating examples of the sheet member illustrated in FIGS. 4 and 5.

For example, the respective stress concentrating portions 50 may include groove portions 53g formed on the second resin layer 43 in each of the sheet members 40, as illustrated in FIG. 8 at (a). Although the groove portions 53g may extend through the second resin layer 43, the groove portions 53g are formed such that the groove portions 53g do not extend through the second resin layer 43 in view of a corrosion restriction effect and a short-circuit restriction effect obtained by covering the metal layer 42. In such a case, the portions where the groove portions 53g are formed on the second resin layers 43 in each of the sheet members 40 are rapidly deformed, which easily causes the cleaving by the stress concentration. Strength at the portions where the groove portions 53g are formed decreases relative to strength at the other portion.

For another example, the respective stress concentrating portions 50 may include groove portions 51g formed on the first resin layer 41 of each of the sheet members 40, as illustrated in FIG. 8 at (b). The groove portions 51g may or do not need to extend through the first resin layer 41. The facing portions 40a where the groove portions 51g are formed do not contribute to joint to the seal portion 30 of each of the sheet members 40, so that the adhesiveness of the first resin layer 41 is maintained even when the groove portions 51g extend through the first resin layer 41. In such a case, the portions where the groove portions 51g are formed on the first resin layer 41 of each of the sheet members 40 are rapidly deformed, which easily causes the cleaving by stress concentration. Strength at least at the portions where the groove portions 51g are formed decreases relative to strength at the other portion.

For still another example, the respective stress concentrating portions 50 may include bending portions 52b formed in the metal layer 42 by bending the whole of each of the sheet members 40, as illustrated in FIG. 8 at (c). Here, buckled portions of the bending portions 52b in the metal layer 42 are rapidly deformed, which easily causes the cleaving by stress concentration. Strength at buckled portions in the bending portions 52b of the metal layer 42 decreases relative to strength at the other portion. All or some of these groove portions 51g, 53g, and the bending portions 52b may be in combination with each other in the respective stress concentrating portions 50.

It is assumed that the shape of the stress concentrating portions 50 in plan view are varied, as illustrated in FIGS. 6 and 7. In an example illustrated in FIG. 6 at (a), the stress concentrating portions 50 are each formed like two straight lines (diagonal lines) that are inclined to the outer edges of each of the facing portions 40a and intersect with each other near a middle of each of the facing portions 40a. The straight lines illustrated in FIG. 6 at (a) express at least one of the groove portions 51g, the groove portions 53g, and the bending portions 52b (the same applies hereafter).

In an example illustrated in FIG. 6 at (b), the stress concentrating portions 50 are each formed like two straight lines that extend along the outer edges of each of the facing portions 40a and intersect with each other near a middle of each of the facing portions 40a. In addition, in an example illustrated in FIG. 6 at (c), the stress concentrating portions 50 are each formed like a curved line having a circular shape (an oval shape in FIG. 6 at (c)) around the middle of each of the facing portions 40a. The curved line illustrated in FIG. 6 at (c) expresses at least one of the groove portions 51g, the groove portions 53g, and the bending portions 52b similarly to the above-described straight lines.

In an example illustrated in FIG. 7 at (a), the stress concentrating portions 50 are each formed like a straight line that extends along one of the outer edges of each of the facing portions 40a. In an example illustrated in FIG. 7 at (b), the stress concentrating portions 50 are each formed like a straight line that extends along the other of the outer edges of each of the facing portions 40a. Thus, it is assumed that the shape of the stress concentrating portions 50 varies, and the shape may be selected as appropriate in accordance with a required cleavage pressure (ease of cleaving or ease of stress concentration). In other words, in the sheet members 40, the cleavage pressure is controllable by selecting the shape of the stress concentrating portions 50.

For example, in a case where the stress concentrating portions 50 having a lower cleavage pressure (being easy to cleave or having large degrees of stress concentration) are required, the stress concentrating portions 50 may be formed like two straight lines that intersect with each other as illustrated in FIG. 6 at (a) and (b). In a case where the stress concentrating portions 50 having a higher cleavage pressure (being difficult to cleave or having low degrees of stress concentration) are required, the stress concentrating portions 50 may be formed like a closed loop (circle or oval) that has no point of discontinuity or no end as illustrated in FIG. 6 at (c). Alternatively, in a case where the stress concentrating portions 50 having a middle cleavage pressure therebetween are required, the stress concentrating portions 50 may be formed like one straight line as illustrated in FIG. 7 at (a) and (b), and may be formed in combination of the various shapes.

A peeling force generated in the joint portion 40b linearly increases as the internal pressure applied to the respective facing portions 40a increases. Here, the internal pressure applied to corresponding one of facing portions 40a when the joint portion 40b is peeled off from the seal portion 30 (that is, the internal pressure in correspondence with the peeling force for breaking the joint between the joint portion 40b and the seal portion 30) is defined as peeling pressure. The sheet members 40 are adjusted such that the cleavage pressure in the stress concentrating portions 50 is lower than the peeling pressure in the joint portion 40b, which causes the cleaving at the stress concentrating portions 50 of the facing portions 40a as the starting points more easily than the braking of the joint between the joint portion 40b and the seal portion 30. With this adjustment, when the internal pressure in one of the internal spaces S increases and the internal pressure are applied to the corresponding facing portion 40a facing the communication hole 30H that communicates with the internal space S, it is avoided that the joint between the joint portion 40b around the facing portion 40a and the seal portion 30 is broken and the above-described internal space S communicates with the other internal space S. In addition, the internal pressure applied to corresponding facing portion 40a when one of the sheet members 40 (a portion of the facing portion 40a where the stress concentrating portion 50 does not exist) is broken is higher than the cleavage pressure or the peeling pressure.

Generally speaking, aspects of increase of the internal pressure may be different between the internal space S in correspondence with the positive terminal electrode 16 or the negative terminal electrode 17 located in an outermost layer of the electrode stack 12 (the internal space S defined by the current collector 21 of the positive terminal electrode 16, the current collector 21 of the bipolar electrode 14 adjacent to the positive terminal electrode 16 in the stacking direction, and the seal portion 30, or the internal space S defined by the current collector 21 of the negative terminal electrode 17, the current collector 21 of the bipolar electrode 14 adjacent to the negative terminal electrode 17 in the stacking direction, and the seal portion 30) and the respective internal spaces S in correspondence with the bipolar electrodes 14 inside the electrode stack 12 (the respective internal spaces S defined by the current collectors 21 of the bipolar electrodes 14 arranged side by side in the stacking direction and the seal portion 30). This may be because while a portion of the positive terminal electrode 16 or the negative terminal electrode 17 located in the outermost layer, which is overlapped with the conductive plates P, is difficult to deform according to the increase of the internal pressure, a portion of the positive terminal electrode 16 or the negative terminal electrode 17 outside the conductive plates P is easily deformed rather than the bipolar electrodes 14 inside according to the increase of the internal pressure, due to the electrode stack 12 restrained in the stacking direction by the conductive plates (restraining plates) P. Thus, the shapes of the stress concentrating portions 50 may be changed between in the outermost layer and in the inner layers.

That is, the plurality of communication holes 30H includes a first communication hole 31H that communicates with internal space S that accommodates the active material layer of the positive terminal electrode 16 (or the negative terminal electrode 17) located in the outermost layer of the electrode stack 12 and the second communication holes 32H different from (other than) the first communication hole 31H (see FIG. 7 at (c)). This configuration makes cleavage pressure in the stress concentrating portion 50 formed in the facing portion 40a facing the opening 30Ha of the first communication hole 31H of the plurality of facing portions 40a different from the cleavage pressure in the stress concentrating portions 50 formed in the facing portions 40a facing the openings 30Ha of the respective second communication holes 32H of the plurality of facing portions 40a. In an example illustrated in FIG. 7 at (c), the stress concentrating portion 50 in correspondence with the outermost layer has higher cleavage pressure relative to the stress concentrating portions 50 in correspondence with the other layers. On the contrary, the stress concentrating portion 50 in correspondence with the outermost layer may have lower cleavage pressure relative to the stress concentrating portions 50 in correspondence with the other layers.

Figure 9:
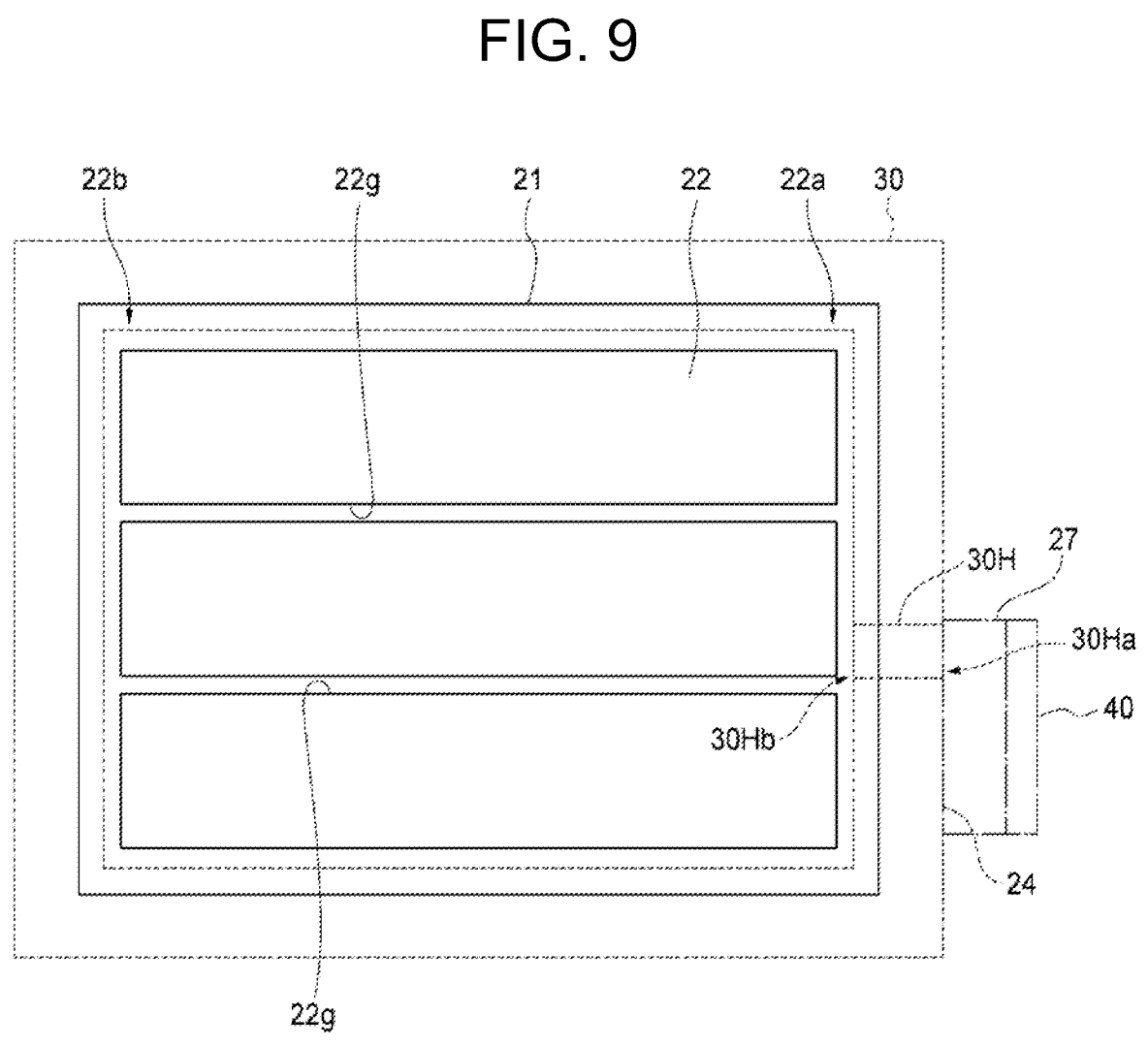

Here, as illustrated in FIG. 9, for example, grooves 22g are formed in each of the positive electrode active material layers 22 of the power storage modules 11 and extend in a direction orthogonal to the stacking direction from one end 22a to the other end 22b of the positive electrode active material layer 22. An opening (second opening) 30Hb of the communication hole 30H oriented to the corresponding internal space S is formed in a portion of the seal portion 30 (sealing portion 13) facing the one end 22a of the positive electrode active material layer 22. That is, the communication hole 30H is formed in a side that intersects with the direction in which the grooves 22g extend and faces the one end 22a of the positive electrode active material layer 22, of all sides of the seal portion 30 (sealing portion 13) formed in the rectangular frame shape. Although only the positive electrode active material layer 22 is illustrated in the drawing, the negative electrode active material layer 23 may also have the same configuration as that of the positive electrode active material layer 22 or only the negative electrode active material layer 23 may have such a configuration.

In addition, the conductive plates P, which restrain the electrode stack 12, may each have the same configuration as that of the positive electrode active material layer 22. That is, grooves may be formed in each of the conductive plates P and extend from one end to the other end of the conductive plate P, and the opening 30Hb oriented to the corresponding internal space S of the communication hole 30H may be formed in a portion of the seal portion 30 facing the one end of the conductive plate P when viewed in the stacking direction. That is, the communication hole 30H may be formed in a side that intersects with a direction in which the grooves extend and is close to the one end 22a of the conductive plate P, of all sides of the seal portion 30 (sealing portion 13) formed in the rectangular frame shape.

As described above, the power storage module 11 is formed of the plurality of electrodes (bipolar electrodes 14, the positive terminal electrode 16, and the negative terminal electrode 17) stacked each including the current collector and the active material layer formed on the current collector. The power storage module 11 includes the electrode stack 12, the seal portion 30, and the sheet members 40. The electrode stack 12 includes the plurality of internal spaces S that accommodate the respective plurality of active material layers. The seal portion 30 is formed in the current collectors so as to seal the plurality of the internal spaces S and has the plurality of communication holes 30H, which provide communication between the plurality of internal spaces S and the outside of the power storage device 1. The sheet members 40 are provided on the seal portion 30 over the plurality of communication holes 30H, seal the respective communication holes 30H individually, and are cleaved to release the internal pressure in the plurality of respective internal spaces S to the outside through the corresponding communication holes 30H. The sheet members 40 each have the plurality of facing portions 40a facing the openings 30Ha that are located opposite to the respective internal spaces S across the plurality of communication holes 30H and the joint portion 40b that is formed in the peripheries of the respective facing portions 40a to enclose the openings 30Ha and joined to the seal portion 30. The respective facing portions 40a have the stress concentrating portions 50 that serve as starting points of the cleaving of the facing portions 40a. The cleavage pressure, which is the internal pressure applied to corresponding one of the facing portions 40a when one of the stress concentrating portions 50 is cleaved, is lower than the peeling pressure, which is the internal pressure applied to corresponding one of the facing portions 40a when the joint portion 40b is peeled off from the seal portion 30.

Accordingly, in this power storage module 11, when the internal pressure in one of the internal spaces S increases, the corresponding sheet member 40 is cleaved at the stress concentrating portion 50 as the starting point in the facing portion 40a facing the communication hole 30H that communicates with the internal space S, thereby releasing the internal pressure in the internal space S individually. Thus, with this power storage module 11, the plurality of internal spaces S is sealed all collectively, so that the increase of the number of components is suppressed even when the plurality of electrodes is stacked one another and the internal pressure in the internal spaces S is individually released when the internal pressure increases. In a case where a lithium-ion secondary battery is used as the power storage module 11, moisture may enter the internal spaces S after the seals are broken to release the internal pressure. Accordingly, using the power storage module 11 again may not be preferable after the internal pressure is released. On the contrary, in the power storage module 11, the internal pressure is irreversibly released by the cleaving of the sheet members 40, so that the power storage module 11 is restricted from being used again in such a case.

In the power storage module 11, the sheet members 40 each include the first resin layer 41 that is joined to the seal portion 30 and the metal layer 42 that is stacked on the first resin layer 41 and located opposite to the seal portion 30 across the first resin layer 41. With this configuration, the first resin layer 41 keeps the adhesiveness of each of the sheet members 40 to the seal portion 30 and the metal layer 42 restricts moisture permeation to the internal spaces S.

In addition, in the power storage module 11, the sheet members 40 each include the second resin layer 43 stacked on the metal layer 42 and located opposite to the first resin layer 41 across the metal layer 42. With this configuration, the second resin layer 43 restricts corrosion and a short-circuit of the metal layer 42.

In the power storage module 11, the respective stress concentrating portions 50 may have groove portions 51g, 53g formed in at least one of the first resin layer 41 or the second resin layer 43. With this configuration, the stress concentrating portions 50 are formed with a breaking strength in the whole of the sheet members 40 being maintained. Specifically, in a case where the groove portions 53g are formed in the second resin layer 43 located outside relative to the other layers, when the respective sheet members 40 are deformed so as to swell outwardly by the increase of the internal pressure in the internal spaces S, tensile stress is further concentrated on the groove portions 53g.

In the power storage module 11, the stress concentrating portions 50 may include the bending portions 52b formed in the metal layer 42. With this configuration, the stress concentrating portions 50 are formed with a simple structure.

In the power storage module 11, the seal portion 30 has the outer side surfaces 13b on which the openings 30Ha are formed and the frame portions 27 that protrude from the outer side surfaces 13b such that the respective frame portions 27 enclose the openings 30Ha, and the joint portion 40b is joined to the frame portions 27. Thus, the joint portions between the sheet members 40 and the seal portion 30 are limited to the frame portions 27, so that the sheet members 40 are easily joined to the seal portion 30.

In the power storage module 11, the grooves 22g are formed in the positive electrode active material layers 22 (or the negative electrode active material layers 23) and extend from the one ends 22a to the other ends 22b of the positive electrode active material layers 22. The openings 30Hb of the communication holes 30H oriented to the respective internal spaces S are formed in the portions of the seal portion 30 facing the one ends 22a of the positive electrode active material layers 22. With this configuration, gas generated in the respective internal spaces S smoothly flows into the communication holes 30H along the grooves 22g, so that the sheet members 40 are quickly cleaved.

In the power storage module 11, the electrode stack 12 may be restrained in the stacking direction of the bipolar electrodes 14, and the like by the conductive plates P, and the grooves extending from the one ends to the other ends of the conductive plates P may be formed in the conductive plates P. Here, the openings 30Hb oriented to the respective internal spaces S of the plurality of communication holes 30H may be formed in the portions of the seal portion 30 facing the one ends of the conductive plates P when viewed in the stacking direction. With this configuration, gas generated in the internal spaces S smoothly flows into the communication holes 30H along the grooves of the conductive plates P, so that the sheet members 40 are quickly cleaved.

In addition, in the power storage module 11, the plurality of communication holes 30H includes the first communication hole 31H communicating with the internal space S that accommodates the active material layer of the electrode (the positive terminal electrode 16 or the negative terminal electrode 17) located in the outermost layer of the electrode stack 12 and the second communication holes 32H different from the first communication hole 31H. The cleavage pressure in the stress concentrating portion 50 formed in the facing portion 40a facing the opening 30Ha of the first communication hole 31H of the plurality of facing portions 40a may be different from the cleavage pressure in the stress concentrating portions 50 formed in the facing portions 40a facing the openings 30Ha of the respective second communication holes 32H of the plurality of facing portions 40a. Generally speaking, the aspects of increase of the internal pressure may be different between in the internal space S in correspondence with the positive terminal electrode 16 or the negative terminal electrode 17 located in the outermost layer of the electrode stack 12 and in the internal spaces S in correspondence with the bipolar electrodes 14 inside the electrode stack 12. Accordingly, using the stress concentrating portions 50 having cleavage pressure different between in the outermost layer of the electrode stack 12 and in the other layers may be effective.

One aspect of the present disclosure is explained in the above-described embodiment. Accordingly, the present disclosure is not limited to the above-described embodiment and may be changed as desired.

For example, in the above-described embodiment, the sheet members 40 each include three layers of the first resin layer 41, the metal layer 42, and the second resin layer 43, as an example. However, the sheet members 40 each may include the first resin layer 41 and the metal layer 42 or may include at least one of the first resin layer 41, the metal layer 42, and the second resin layer 43.

In the example of the above-described embodiment, the seal portion 30 (sealing portions 13) has the frame portions 27 and the sheet members 40 are joined to the frame portions 27. However, the seal portion 30 need not have the frame portions 27, and the sheet members 40 may be joined to a flat surface of the seal portion 30.

In addition, in the above-described embodiment, the grooves 22g are formed in the positive electrode active material layers 22 and a positional relationship among the grooves 22g, the communication holes 30H, and the sheet members 40 is identified. However, the grooves 22g need not be formed in the positive electrode active material layers 22, and the positional relationship among the grooves 22g, the communication holes 30H, and the sheet members 40 may be changed even when the grooves 22g are formed.

REFERENCE SIGNS LIST 11 power storage module
12 electrode stack (stack)
14 bipolar electrode (electrode)
16 positive terminal electrode
17 negative terminal electrode
21 current collector
22 positive electrode active material layer (active material layer)
22g groove
23 negative electrode active material layer (active material layer)
27 frame portion
30 seal portion
30H communication hole
30Ha opening (first opening)
30Hb opening (second opening)
31H first communication hole
32H second communication hole
40 sheet member
40a facing portion
40b joint portion
41 first resin layer
42 metal layer
43 second resin layer
50 stress concentrating portion
51g, 53g groove portion
52b bending portion
P conductive plate (restraining plate)
S internal space

The invention claimed is:
1. A power storage module comprising:
a stack formed of a plurality of electrodes stacked each including a current collector and an active material layer formed on the current collector;
a seal portion formed in the current collectors and cooperating with the current collectors arranged side by side in a stacking direction of the electrodes to define a plurality of internal spaces that accommodates the respective active material layers;
a plurality of communication holes formed in the seal portion and providing communication between the plurality of internal spaces and an outside; and
a sheet member provided on the seal portion over the plurality of communication holes, sealing the communication holes individually, and cleaved to release internal pressure in the plurality of respective internal spaces to the outside through the corresponding communication holes, wherein
the sheet member has a plurality of facing portions facing first openings that are located opposite to the respective internal spaces across the plurality of communication holes and a joint portion that is formed in peripheries of the respective facing portions to enclose the first openings and joined to the seal portion,
the respective facing portions have stress concentrating portions that serve as starting points of the cleaving, and
cleavage pressure, which is the internal pressure applied to corresponding one of the facing portions when one of the stress concentrating portions is cleaved, is lower than peeling pressure, which is the internal pressure applied to corresponding one of the facing portion when the joint portion is peeled off from the seal portion.

2. The power storage module according to claim 1, wherein
the sheet member includes a first resin layer that is joined to the seal portion and a metal layer that is stacked on the first resin layer and located opposite to the seal portion across the first resin layer.

3. The power storage module according to claim 2, wherein
the sheet member includes a second resin layer that is stacked on the metal layer and located opposite to the first resin layer across the metal layer.

4. The power storage module according to claim 3, wherein
the stress concentrating portions each include a groove portion formed in at least one of the first resin layer or the second resin layer.

5. The power storage module according to claim 2, wherein
the stress concentrating portions each include a bending portion formed in the metal layer.

6. The power storage module according to claim 1, wherein
the seal portion has outer side surfaces on which the respective first openings are formed and a frame portion that protrudes from the outer side surfaces such that the frame portion encloses the first openings, and the joint portion is joined to the frame portion.

7. The power storage module according to claim 1, wherein
the active material layers have grooves that extend from one ends to the other ends of the respective active material layers, and
second openings of the plurality of communication holes oriented to the respective internal spaces are formed in portions of the seal portion facing the one ends of the respective active material layers.

8. The power storage module according to claim 1, wherein
the stack is restrained in the stacking direction of the electrodes by restraining plates, the restraining plates have grooves that extend from one ends to the other ends of the respective restraining plates, and the second openings of the plurality of communication holes oriented to the respective internal spaces are formed in portions of the seal portion facing the one ends of the respective restraining plates when viewed in the stacking direction.

9. The power storage module according to claim 1, wherein the plurality of communication holes includes a first communication hole communicating with the internal space that accommodates the active material layer of the electrode located in an outermost layer of the stack and second communication holes different from the first communication hole, and the cleavage pressure in the stress concentrating portion formed in the facing portion facing the first opening of the first communication hole of the plurality of facing portions is different from the cleavage pressure in the stress concentrating portions formed in the facing portions facing the openings of the respective second communication holes of the plurality of facing portions.

* * * * *